US 6,708,237 B1

(12) United States Patent
Bridge

(10) Patent No.: US 6,708,237 B1
(45) Date of Patent: Mar. 16, 2004

(54) METHOD AND APPARATUS FOR MANAGING DATA ACCESS AND STORAGE OF DATA LOCATED ON MULTIPLE STORAGE DEVICES

(75) Inventor: William Bridge, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 10/008,347

(22) Filed: Nov. 9, 2001

Related U.S. Application Data

(62) Division of application No. 09/231,150, filed on Jan. 15, 1999, now Pat. No. 6,330,625.

(51) Int. Cl.⁷ .............................................. G06F 13/14
(52) U.S. Cl. ........................ 710/39; 360/90; 711/114; 711/168
(58) Field of Search ............................. 710/39; 360/90; 711/114, 165

(56) References Cited

U.S. PATENT DOCUMENTS

| 5,155,845 A | * | 10/1992 | Beal et al. .................. 395/575 |
| 5,287,459 A | * | 2/1994 | Cniewek ...................... 369/34 |
| 5,388,108 A | | 2/1995 | DeMoss et al. |
| 5,469,443 A | | 11/1995 | Saxena |
| 5,524,204 A | | 6/1996 | Verdoorn, Jr. |
| 5,559,764 A | * | 9/1996 | Chen et al. .................... 369/30 |
| 5,574,851 A | | 11/1996 | Rathunde |
| 5,615,352 A | | 3/1997 | Jacobson et al. |
| 5,790,774 A | | 8/1998 | Sarkozy |
| 5,862,158 A | | 1/1999 | Baylor et al. |
| 5,875,456 A | | 2/1999 | Stallmo et al. |
| 5,893,919 A | | 4/1999 | Sarkozy et al. |
| 5,987,566 A | | 11/1999 | Vishlitzky et al. |
| 6,000,010 A | | 12/1999 | Legg |
| 6,035,373 A | | 3/2000 | Iwata |
| 6,047,294 A | | 4/2000 | Deshayes et al. |
| 6,058,454 A | | 5/2000 | Gerlach et al. |
| 6,067,199 A | | 5/2000 | Blumenau |
| 6,092,169 A | | 7/2000 | Murthy et al. |
| 6,138,125 A | | 10/2000 | DeMoss |
| 6,195,761 B1 | | 2/2001 | Kedem |
| 6,223,252 B1 | | 4/2001 | Bandera et al. |
| 6,233,696 B1 | | 5/2001 | Kedem |
| 6,405,284 B1 | | 6/2002 | Bridge |

OTHER PUBLICATIONS

Verita Software Corporation, Veritas Volume Manager (VxVM) User's Guide, Release 2.3, 1996.
Digital Equipment Corporation, Logical Storage Manager, Mar. 1996.
Digital Equipment Corporation, Introduction to the Logical Storage Manager, pp. 1–23, Mar. 1996.
Digital Equipment Corporation, LSM Configurations, pp. 1–12, Mar. 1996.
Digital Equipment Corporation, Setting Up LSM, pp. 1–11, Mar. 1996.
Digital Equipment Corporation, Encapsulating Existing User Data to LSM Volumes, pp. 1–17, Mar. 1996.
Digital Equipment Corporation, LSM Root and Swap Disk Mirroring, pp. 1–8, Mar. 1996.

* cited by examiner

Primary Examiner—Abdelmoniem Elamin
(74) Attorney, Agent, or Firm—Bingham McCutchen LLP

(57) ABSTRACT

An apparatus and method for accessing a data item from a storage system having a plurality of data storage devices are disclosed. I/O operation requests are submitted to multiple data storage devices for each data item to be accessed. The I/O operation requests are issued to copies of the data items that reside on a plurality of data storage devices. More I/O operation requests are submitted than the number of data items that are to be accessed, written, or updated.

32 Claims, 6 Drawing Sheets

METHOD AND APPARATUS FOR MANAGING DATA ACCESS AND STORAGE OF DATA LOCATED ON MULTIPLE STORAGE DEVICES

This application is a divisional of U.S. patent application Ser. No. 09/231,150 filed on Jan. 15, 1999 now U.S. Pat. No. 6,33,625.

BACKGROUND OF THE INVENTION

1. Field of the Invention

The present invention relates to storage systems. More particularly, the invention relates to a method and apparatus for managing storage and access of data that is mirrored or copied to multiple storage locations.

2. Description of the Related Art

The present invention is directed to a method and system for improving I/O response times for applications that require optimal response times for data access, such as applications directed to storing or retrieving on-demand video or audio. Applications that provide video streams (or audio streams) often store portions of the video data in many locations on many data storage devices. As used herein, the term "data storage device" refers to any device or apparatus utilizable for the storage of data, e.g., a disk drive. For explanatory purposes only and not as an intent to limit the scope of this invention, the term "disk drive" will be used throughout this document instead of the term "data storage device."

To provide video on-demand at the proper display rate, the portions of stored video data are continually being retrieved and displayed at a viewing device. However, different disk drives often provide different momentary response times to I/O requests due to varying system and environmental factors such as disk drive load, number of other requests on I/O request queues, network traffic, and physical disk drive proximity. If the video data is stored on many storage devices, then it is possible for the video data to be delivered out of order if some of the disk drives have momentary response times that are slower (or faster) than other disk drives.

One solution to this problem is to issue an I/O command for a particular piece of video data only when the prior sequential piece of video data has been delivered. Alternatively, the system may buffer data so that even if the video stream arrives out of order, the video data is presented in order on the viewing device. The drawback to these solutions is that the delivered video stream is potentially stopped or constricted if any particular piece of video data has a relatively slow I/O response or delivery time. In other words, this method could produce an unacceptable display rate in the viewing device, resulting in a video stream that appears to have delayed or stopped motion on that display.

Another solution is to allow the video data to continue to stream even if the data arrives out of order, but to ignore any earlier pieces of data in the video sequence that arrive at the viewing device after a later piece of data in the video sequence. The drawback to this method is that gaps may appear in the video stream at the viewing device, resulting in a video stream having a jerky motion on the display.

Another solution is to store the video data (striped or unstriped) in an ordered manner on the disk drives. In this way, the chance of video data arriving out of order is reduced. One drawback to striping data in an ordered manner across disk drives is that it presents problems when new disk drives are added to the system. Adding new disk drives may require wholesale restriping of data across the new configuration of disk drives. Moreover, storing data in an ordered fashion may cause load balancing problems, since the data cannot be randomly scattered across the disk drives.

Thus, there is a need for a method and system for allowing optimal response times for access to data items stored in a storage system.

SUMMARY OF THE INVENTION

The invention encompasses a method and apparatus for managing storage and access of data to a storage system having a plurality of data storage devices.

One aspect of the invention is directed to reading a data item from a storage system with optimized response time, in which multiple copies of the data items are stored to the storage system. The invention discloses a method of submitting more I/O read requests for the data item than are actually required to service the I/O needs of the node making the requests.

Another aspect of the invention is directed to writing and updating a data item, whether mirrored or not, to a storage system. One feature of this aspect is the submission of more I/O write or update requests than are actually required to service the original I/O needs of the node making the requests.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION OF EMBODIMENT(S)

The present invention provides a method and system for increasing I/O response time by mirroring or replicating data at two or more locations, and submitting I/O requests to multiple storage locations for the same data. Different disk drives may provide different response times to I/O requests due to varying system and environmental factors such as disk load, number of other requests on I/O request queues, network traffic, physical disk drive proximity, and unexpected failures. The present invention increases the likelihood of a faster response time to a particular request by sending the same request to two or more different disk drives that contain mirrored or replicated copies of the same data. When a determination has been made as to the request that will produce the fastest response time, the other requests can thereafter be cancelled or ignored.

Mirroring involves the replication of data at two or more separate and distinct disk drives. To protect against the loss of information in the event of a disk drive failure, mirroring can be employed to ensure continued access to data. However, mirroring can also be used to allow data retrieval from multiple storage locations. The present invention is applicable to any type of mirroring system, such as systems that mirror entire disk drives or systems that mirror only select partitions on a disk drive. Furthermore, the present invention is operable with systems that can mirror at granularities much smaller than the entire disk drive, such as the storage system disclosed in co-pending U.S. application Ser. No. 09/177,916, entitled "Method And System For Managing Storage From Multiple Data Storage Devices", filed on Oct. 23, 1998 and application Ser. No. 09/178,387, entitled "Method and System for Managing Storage Systems Containing Redundancy Data", filed on Oct. 23, 1998, both of which are hereby incorporated by reference in their entirety.

Figure 1:
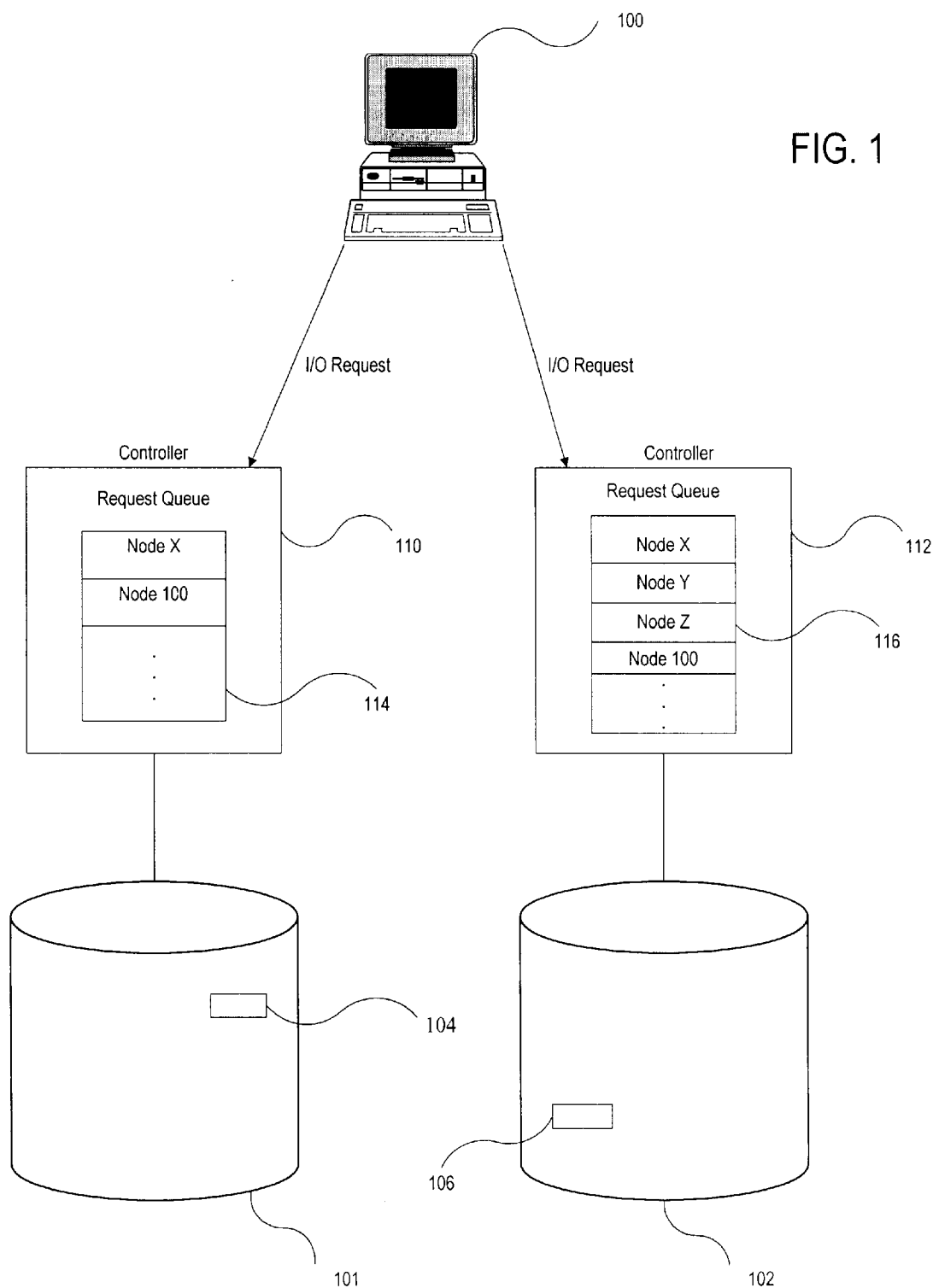
FIG. 1 illustrates an embodiment of a computer node accessing a disk storage system.

To illustrate an embodiment of this invention, shown in FIG. 1 are disk drives 101 and 102 which are connected to disk controllers 110 and 112 respectively. Disk controller 110 comprises a request queue for I/O requests made against disk drive 104 and disk controller 112 comprises a request queue 116 for I/O requests made against disk drive 102. A particular data item is mirrored or replicated at extent 104 on disk 101 and at extent 106 on disk 102.

If a client application on node 100 seeks to retrieve the data item, it may send an I/O request to either disk 101 or 102 to read the contents of extents 104 or 106. However, the momentary response time of one of the disk drives may be significantly slower than the momentary response time of the other disk drive. This may occur, for example, if the request queue for one of the disk drives is longer than the request queue for the other. Thus, if node 100 queues its I/O request at random against one of the disk drives, there is a chance that its request will be made against the disk drive having the slower response time, and hence will result in a delayed response to the I/O request.

To address this problem, the method of the present invention comprises the queuing of I/O requests for mirrored data at multiple data storage locations. According to the invention, node 100 queues its I/O request to both disk drives 101 and 102. Thus, the I/O request can be added to the request queue 114 on disk controller 110 and to the request queue 116 on disk controller 112. Node 100 will then utilize the response from whichever disk controller/disk drive provides the fastest response time. Once node 100 receives a response from one disk controller/disk drive, a cancel command can be sent to the other disk controller/disk drive. The cancel command may take the form of an instruction to remove the I/O request from the slower disk drive's corresponding request queue.

Alternatively, node 100 may allow both I/O operations to proceed to completion, even if a response has already been received from the faster disk drive, but will ignore and/or not utilize the later response that arrives from the slower disk drive. Illustrated in FIG. 1 are I/O requests for mirrored data sent to only two disk drives, but the present invention is applicable to any number of disk drives containing mirrored or replicated data.

It is possible that more than one I/O request may complete at the same time. If multiple responses are received at node 100 at the same time, then only one is utilized, and the remaining responses are ignored/not utilized.

Figure 2:
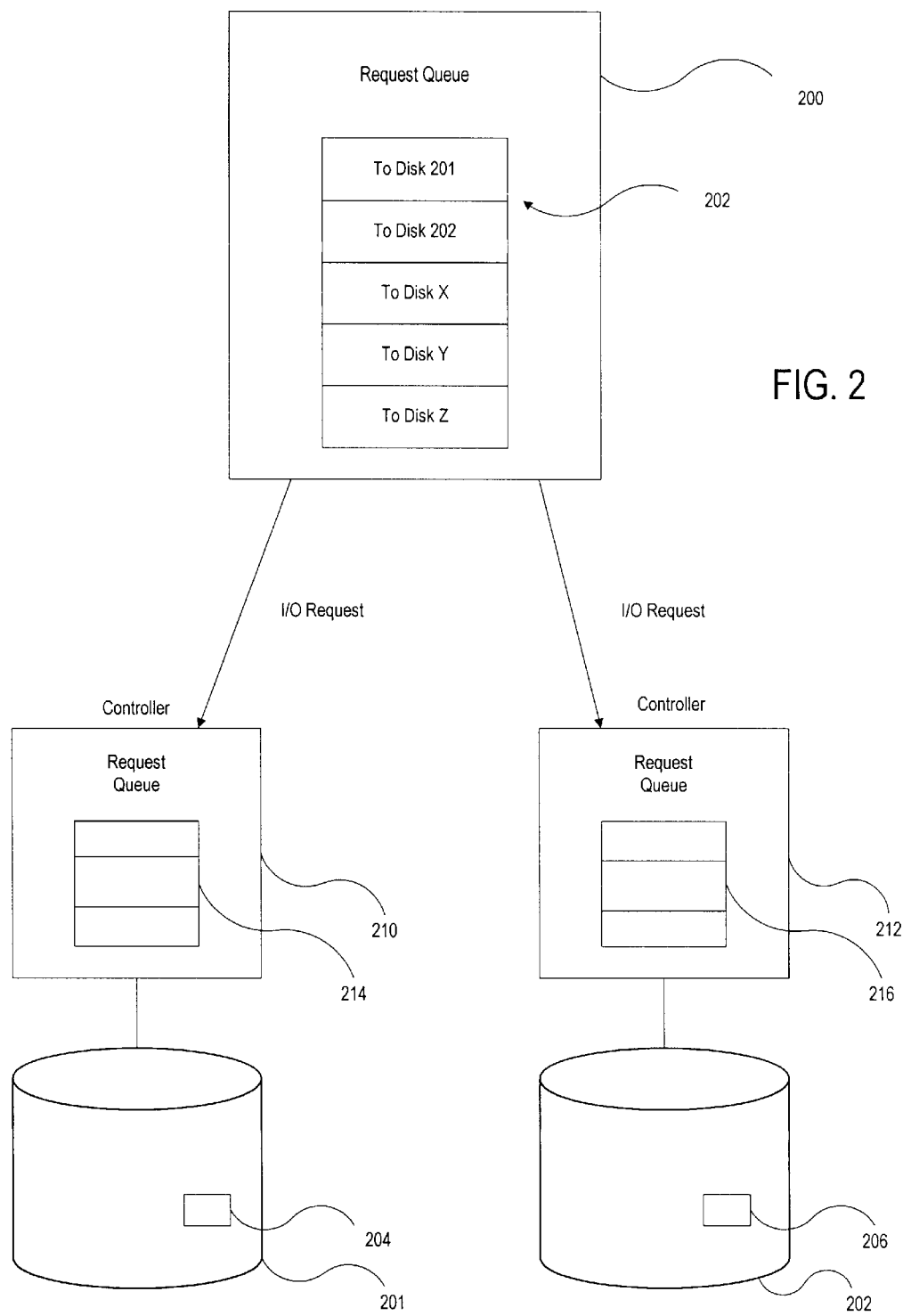
FIG. 2 illustrates an embodiment of a computer node having an I/O request queue accessing a disk storage system.

The present invention is applicable to systems having multiple levels of request queues. Referring to the system illustrated in FIG. 2, shown is a computer node 200 having its own I/O request queue 202. Disk controllers 210 and 212 also have their own request queue to handle I/O requests for their corresponding disk drives 201 and 202. In the example of FIG. 2, an I/O request may be queued at either the node 200 itself (in request queue 202), or at the disk controllers (in request queues 214 and 216). One reason for having multiple levels of queues is that the request queue for some disk controllers/disk drives permit only a single entry from each node on the system. Thus, the requesting node must maintain its own request queue to schedule and coordinate multiple I/O requests directed to that disk controller/disk drive.

When the invention is utilized in a system having multiple levels of request queues, I/O requests can be cancelled from any level. As an illustrative example, consider when a client application on node 200 seeks to access an item of data which is mirrored at disk locations 204 and 206 on disk drives 201 and 202 respectively. Node 200 may issue I/O requests to both disk drives, resulting in I/O requests that are initially added to request queue 202 on node 200. If request queues 214 and/or 216 have sufficient entry space, then the I/O requests can be removed from request queue 202 and sent to request queues 214 and/or 216. Once a response has been received for a first I/O request to one disk drive, the second I/O request to the other disk drive can be cancelled. Depending upon the configuration of the system, the second I/O request can be cancelled from either the request queue 202 on node 200, or if the I/O request has already been sent from request queue 202, it can be cancelled from the request queue for the second disk controller/disk drive.

Consistent with the invention, various events and conditions can be chosen to indicate that one disk drive will provide a faster response time than other disk drives, and thus will trigger cancellation or ignore commands for I/O requests sent to the other disk drives having slower response times. In one embodiment, cancellation commands are issued to "slower" disk drives only when a first I/O request results in a fully delivered response from a disk drive (for a read request, this occurs when the requested data item has been fully retrieved and loaded into the requesting node's buffer). Another example of a possible triggering event is the movement of an I/O request from one request queue level to another. For example, if multiple I/O requests for a mirrored data item are loaded into request queue 202, the movement of a single one of those I/O requests to the request queue of a disk controller/disk drive could trigger the cancellation of the other related I/O requests still waiting in request queue 202. Depending upon the particular application to which the invention is directed, other triggering conditions and events can be employed within the scope of the invention.

The method of the present invention results in more requests that are placed on I/O queues than are actually required to service the immediate I/O needs of a client. This provides more even load balancing so that there are much more guarantees of service delivery. However, the present invention may result in multiple I/O requests sent to disk drives that either are not cancelled or cannot be cancelled. An uncancellable I/O request may occur, for example, if a particular disk controller does not allow external commands to remove an I/O request from its request queue. To address this, an embodiment of the system may be configured to allow multiple I/O requests to proceed to completion, but only the results from the fastest response disk drive is utilized. However, excess resource consumption may occur if the slower I/O requests cannot be cancelled, since some systems may not permit resources allocated for uncancellable I/O requests to be released until all the related I/O requests have completed.

For example, the disk system may be obligated to allow all related I/O requests to complete before reallocating memory in the node's buffer that is set aside for the anticipated response to these requests. In an embodiment, this can be handled in two ways. First, a single buffer allocation can be made for all related I/O requests for the same mirrored data. Each response to the I/O requests writes to the same buffer location. Therefore, regardless of how many I/O requests are queued, only a single buffer allocation is made to hold the responses. Alternatively, a separate buffer allocation can be made for each I/O request. When the first response is received at the requesting node, the buffer allocation containing the first response is accessed and then freed. Thereafter, each other buffer allocation is freed once their respective responses also arrive.

Significantly, the present invention does not require a common (or global) queue to be operational. Thus, the present invention does not require a requesting node to be able to contemporaneously view the contents of the request queue for any disk controller/disk drive that it seeks to access. This is a key advantage over a related technique to retrieve mirrored data from disk drives, which requires a node to be able to view the request queues of the various disk drives containing the mirrored data and in which the I/O request is sent only to the disk drive having the shortest queue. The present invention provides a significant advantage over this technique since many disk systems do not provide or allow external access to view disk drive request queues, rendering the related technique inoperable. Moreover, even if an I/O request is sent to a particular disk drive having the numerically shortest request queue, other system and environmental factors (such as disk drive proximity and system workloads) may result in a slower response time from that disk drive as compared to other disk drives having longer request queues.

Figure 3:
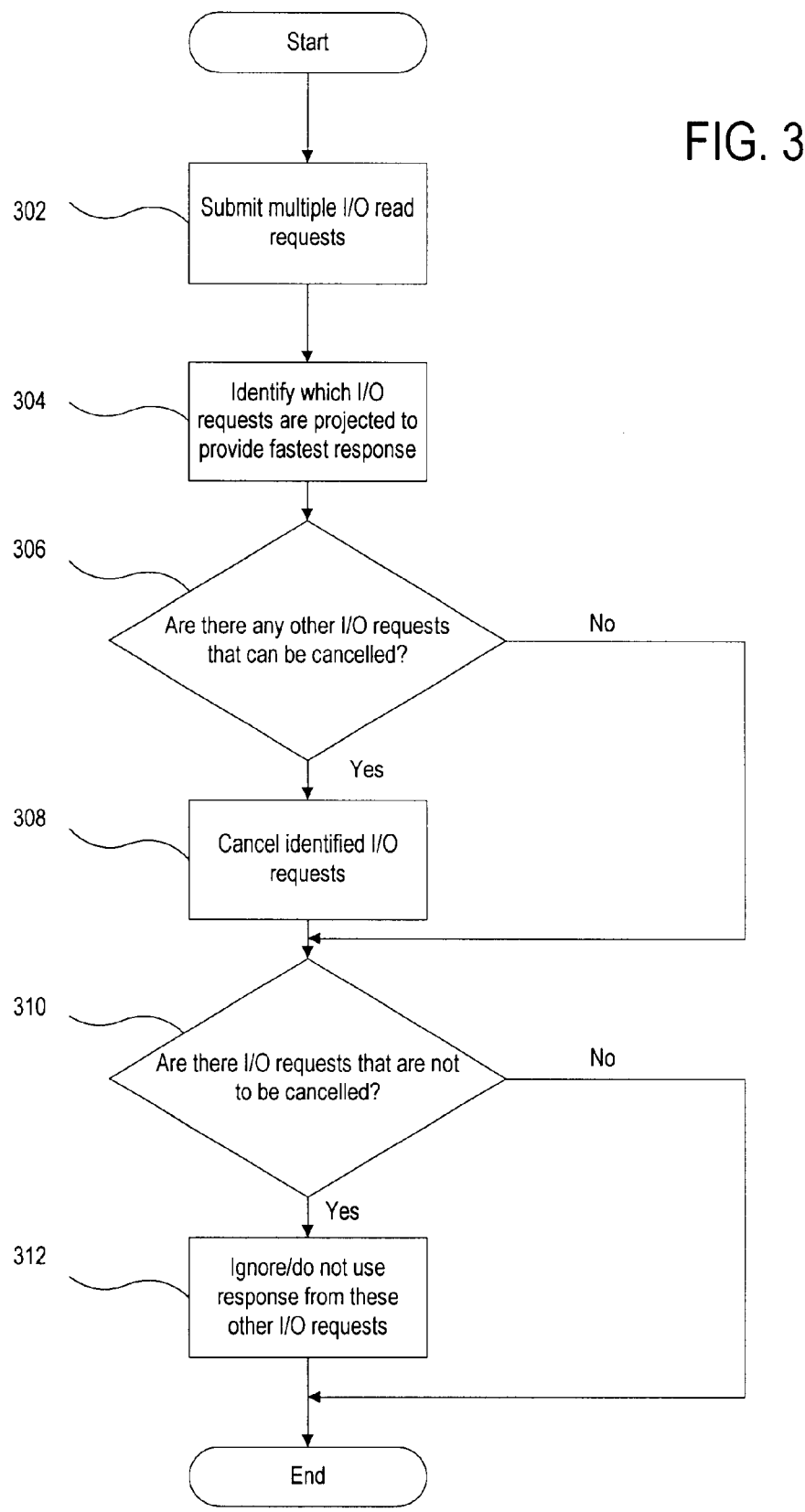
FIG. 3 is a flow diagram showing a process for reading data from a disk storage system.

FIG. 3 illustrates the process flow for an embodiment of the invention that is used to perform read operations. The process for performing optimized reads according to the invention requires the storage system to maintain replicated or mirrored copies of the requested data items at two or more disk drives. As shown in FIG. 3, the following process actions are performed to read data according to an embodiment of the invention:

1. Submit I/O read operation requests to multiple disk drives that contain a mirrored or replicated copy of the requested data item (302). An I/O read operation request should be submitted to at least two disk drives that contain a copy of the data item. If more than two disk drives contain copies of the data item, then the requesting node may direct I/O requests to some or all of those disk drives.

2. Identify which disk drive is projected to provide the fastest response time to the I/O requests (304). In an embodiment, this determination is made by identifying the first disk drive to actually provide the requested data item to the requesting node. Other determination criteria may be implemented within the scope of the invention. For example, in an alternate embodiment, this determination is made by identifying the first I/O read operation request to move from one level of request queues to another.

3. Test whether any of the other I/O read operation requests can be cancelled (306). This includes pending I/O read operation requests for the data item that have not yet been processed. If they exist, then cancellation commands (e.g., a command to remove the I/O request from a request queue) are issued to the identified I/O read operation requests that can be cancelled (308).

4. Test whether there exists other pending I/O read operation requests that are not or cannot be cancelled (310). I/O read operation requests may be uncancellable, if a particular disk controller/disk drive is not configured to allow external instructions to remove an I/O request from its request queue. The system may also choose not to incur the overhead of issuing cancellation commands for particular I/O read operations requests. If there exists any I/O requests that are not cancelled, then the requested data items may actually be retrieved from the respective disk drives responsive to the I/O read operations requests, but the requesting node will ignore and/or not utilize the data items that are retrieved (312).

Figure 4:
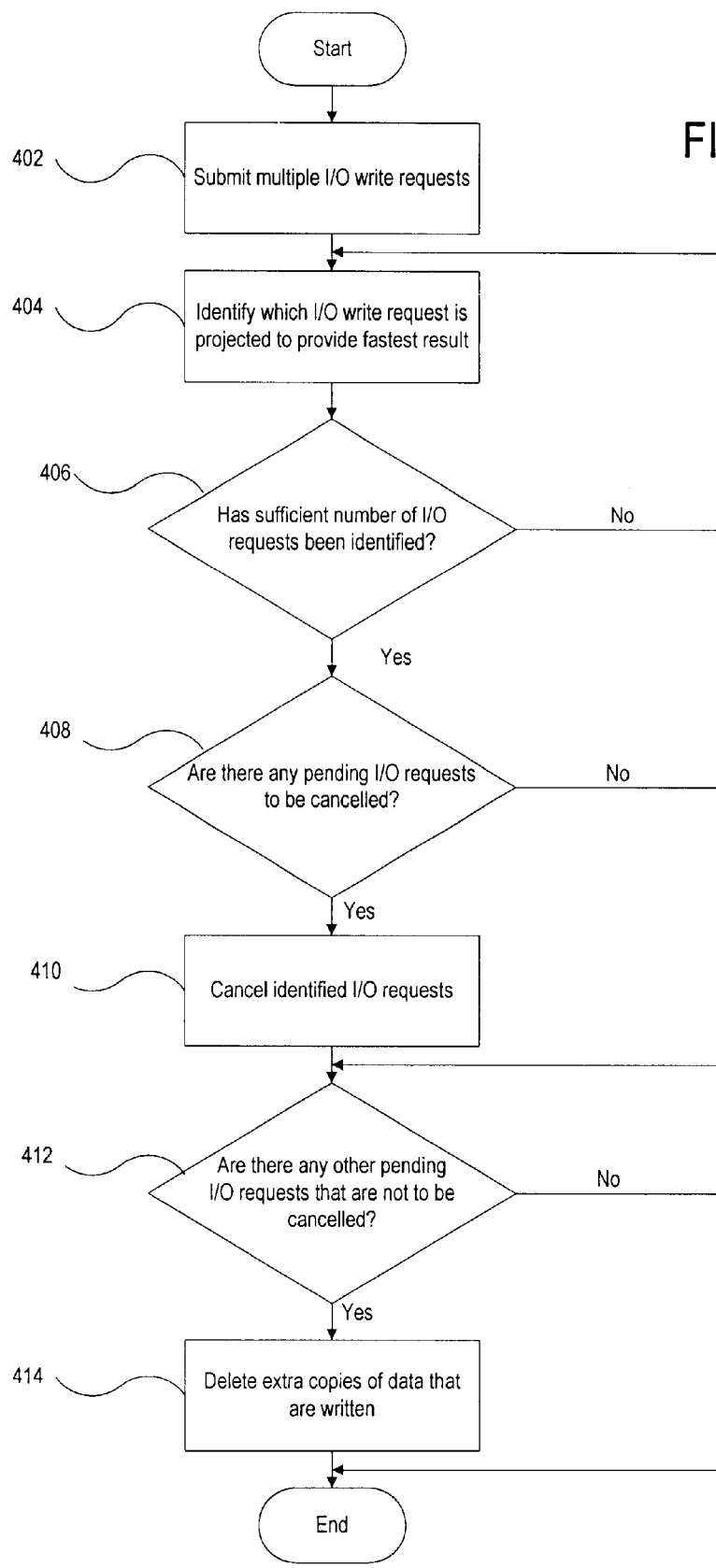
FIG. 4 is a flow diagram showing a process for writing data to a disk storage system.

The present invention can be employed to perform write operations to system data. FIG. 4 illustrates a process flowchart of the actions performed to execute the write operation in an embodiment of the invention:

1. Submit I/O write operation requests to multiple disk drives (402). The number of I/O requests should exceed the number of data copies that are intended to be written out and saved to disks. For example, suppose that the data item is to be written out and saved in a triple mirrored system, i.e., there are intended to be three mirrored copies of the data item on three separate disk drives. Therefore, I/O write operations requests should be submitted to at least four or more disk drives to perform the desired write request. For a system in which mirroring is not used (i.e., only a single copy of the data item needs to be written), at least two or more I/O write operation requests should be submitted.

2. Identify which I/O write operation request is projected to provide the fastest response for the requested write operation (404). In an embodiment, this determination is made by identifying the first I/O write operation request that has actually completed the requested operation by writing the data item to disk. Other determination criteria may be implemented within the scope of the invention. For example, in an alternate embodiment, this determination is made by identifying the first I/O write operation request to move from one level of request queues to another.

3. Test whether a sufficient number of "fast" I/O requests has been identified (406). In a system that utilizes mirroring, more than one copy of a data item has to be written and saved to disk. For example, in a system having triple mirroring, the fastest three I/O requests are identified before discarding the other "slower" I/O write operation requests. Thus, if additional I/O request(s) need to be identified, the process returns back to process action 404 to identify an additional "fastest" I/O write operation requests. If a sufficient number of I/O write operation requests have already been identified, then the process proceeds to process action 408.

4. Test whether there exists any pending I/O write operation requests for the data item that are to be cancelled (408). If so, then issue the appropriate cancellation commands (410). Otherwise, proceed to process act 412.

5. Test whether there exists any pending I/O write operation requests for the data item that are not to be cancelled or that cannot be cancelled (412). If they exist, then allow the I/O write operation requests to proceed to completion, but deallocate the disk space or delete the data items that are written to disk (414).

Figure 5:
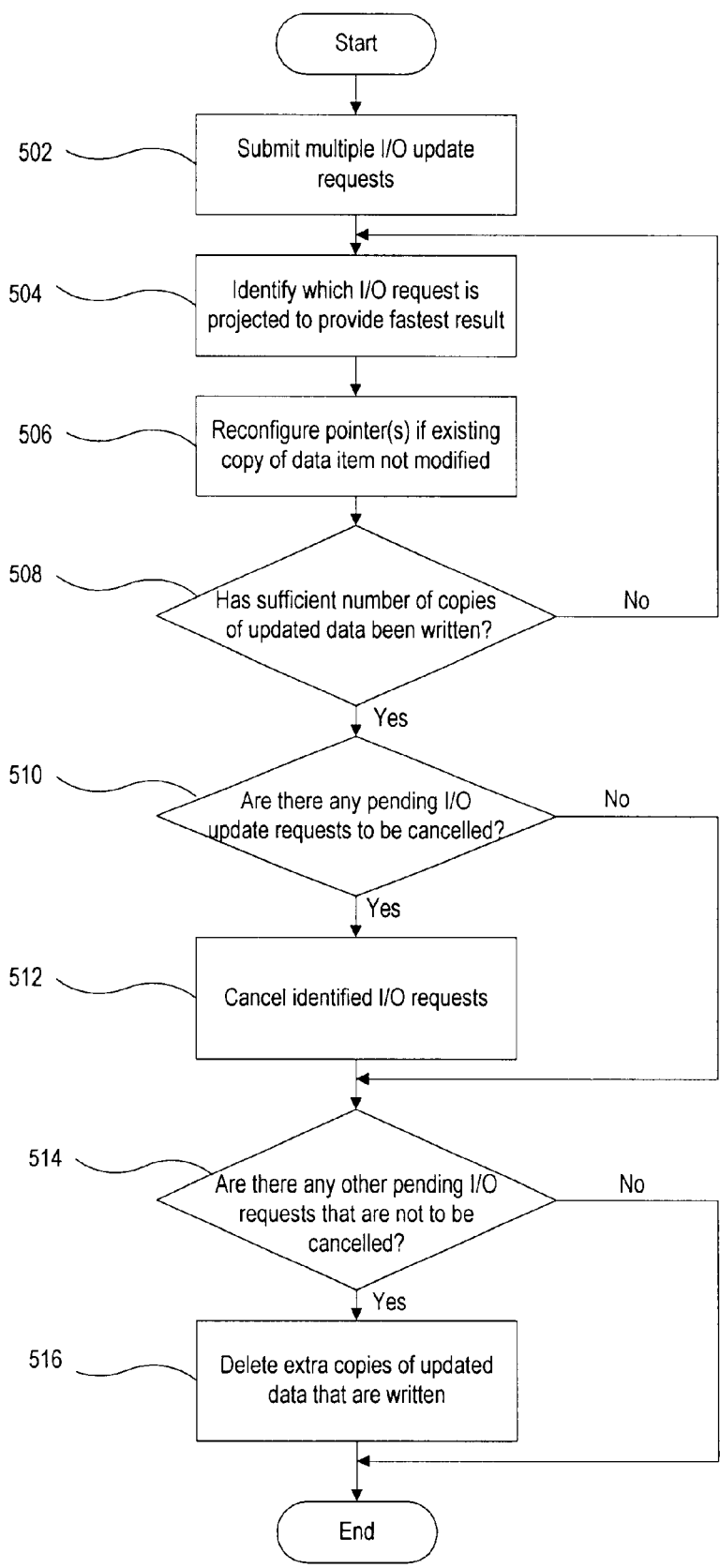
FIG. 5 is a flow diagram showing a process for updating data to a disk storage system.

The present invention can be employed to perform update requests to system data. Update requests seek to modify or update data items that already exist on the system disk drives. FIG. 5 illustrates a process flowchart of the actions performed to execute update requests in an embodiment of the invention:

1. Submit I/O update operation requests to multiple disk drives (502). The number of I/O update operation requests should exceed the number of data copies that are intended to be maintained on the disk drives. For example, suppose that the data item is to be updated in a triple mirrored system, i.e., there are three mirrored copies of the data item on three separate disk drives that must be maintained. Therefore, the requesting node should submit I/O update operation requests to at least four or more disk drives to perform the update operation. For a system in which mirroring is not used, I/O update operation requests should be submitted to at least two or more disk drives.

2. Identify which I/O update operation request is projected to provide the fastest response time for the requested update operation (504). In an embodiment, this determination is made by identifying the first I/O update operation request that has actually completed the requested update operation. Other determination criteria may be employed within the scope of the invention. For example, in an alternate embodiment, this determination can be made by identifying the first I/O update operation request to move from one level of request queues to another.

3. In operation, the process of updating a data item is functionally the same as writing a data item to an unused section of a disk drive. Updating a data item does not actually modify the existing data item already on disk, but writes the update data to a new and unused section of a disk drive. Once the updated data is written to a disk drive, pointers to the existing data are reconfigured to point to the newly written updated data (506). Further I/O read requests for the data item would be directed to this newly written section of the disk drive.

Alternatively, one or more of the I/O update operation requests may be directed to modifying the existing data item at an original disk drive location, rather than writing the updated data item to an unused section of a disk drive. If the "fastest" I/O update request is identified to be a request that updates an existing copy of the data item, then the pointers to this copy of the data item does not have to be reconfigured.

In an embodiment, the pointers to the data item are not reconfigured until a sufficient number of "fast" I/O requests have been identified. At that point, pointers to existing copies of the data item that are not to be modified by one of the identified "fast" I/O requests would be reconfigured in process action 506. The existing copies of the data item which are no longer pointed to can be deleted from their respective disk drives. In some systems, this action may not be necessary once the original pointers to these sections of the disk drives have been redirected to the newly written sections of disk drives that contain the updated data.

4. Determine if more copies of the updated data need to be written to disk (508). If so, then return back to process action 504 and allow another pending I/O update operation request to proceed to completion. If only a single copy of the data item is to be written to disk (i.e., mirroring is not employed), then the first update actually written to a disk drive satisfies the required number of copies. However, if mirroring is employed, then additional copies of the updated data must be written to disk drives.

5. Once sufficient copies of the updated data have been written, test whether additional pending I/O update operation requests are to be cancelled (510). If true, then cancel the identified I/O update operation requests (512).

6. Test whether there exists pending I/O update operation requests for the same update that are not to be cancelled (514). This includes I/O requests which cannot be cancelled, as well as I/O requests that the system chooses not to cancel. If such I/O requests exist, then allow these requests to proceed to completion, but deallocate the disk drive space or delete the updated data that is written to disk as a result of these requests (516).

Hardware Overview

Figure 6:
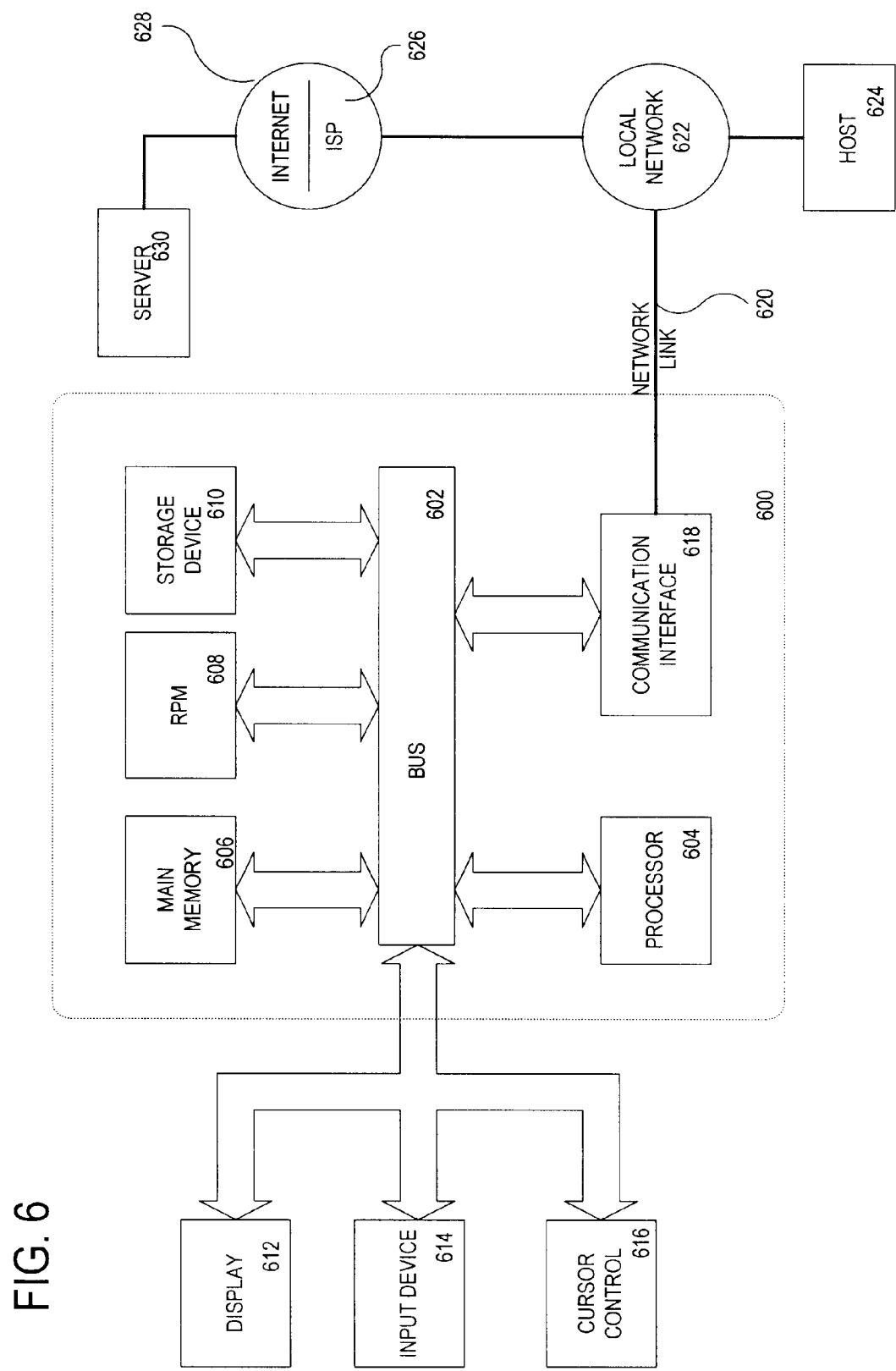
FIG. 6 is a diagram of a computer hardware system with which the present invention can be implemented

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing and allocating storage within a system comprising multiple data storage devices. According to one embodiment of the invention, such use is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for managing, storing, and retrieving data from a storage system containing multiple data storage devices. The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of writing a data item to a storage system having a plurality of data storage devices, the method comprising:

receiving a write request for writing a predetermined number of copies of said data item to said plurality of data storage devices; and initiating write operation requests to a selected number of said plurality of data storage devices in response to said write request, the selected number exceeding said predetermined number.

2. The method of claim 1, further comprising identifying a first set of said write operation requests that are projected to produce a fastest response time.

3. The method of claim 2, further comprising canceling a second set of said write operation requests.

4. The method of claim 2, further comprising:

completing a second set of said write operation requests; and deleting copies of said data item written by said second set of said write operation requests.

5. The method of claim 2, wherein identifying a first set of said write operation requests comprises identifying said first set of said write operation requests as being first to complete writing said data item to said selected number of said plurality of data storage devices.

6. The method of claim 2, wherein identifying a first set of said write operation requests comprises identifying said first set of said write operation requests as being first in moving from one level of request queues to another.

7. The method of claim 1, wherein receiving a write request comprises receiving said write request for writing said data item to at least two of said plurality of data storage devices.

8. A method of updating a data item in a storage system having a plurality of data storage devices, the method comprising:

receiving an update request for maintaining a predetermined number of copies of said data item in said plurality of data storage devices; and initiating update operation requests to a selected number of said plurality of data storage devices in response to said update request, said selected number exceeding said predetermined number.

9. The method of claim 8, further comprising identifying a first set of said update operation requests that are projected to produce a fastest response time.

10. The method of claim 9, further comprising canceling a second set of said update operation requests.

11. The method of claim 9, further comprising:
completing a second set of said update operation requests; and
deleting copies of said data item written by said second set of said update operation requests.

12. The method of claim 9, wherein identifying a first set of said update operation requests comprises identifying said first set of said update operation requests as being first to update said data item to said selected number of said plurality of data storage devices.

13. The method of claim 9, wherein identifying a first set of said update operation requests comprises identifying said first set of said update operation requests as being first in moving from one level of request queues to another.

14. The method of claim 8, wherein initiating update operation requests comprises initiating at least one of said update operation requests for updating an existing copy of said data item on one of said plurality of data storage devices.

15. The method of claim 8, wherein initiating update operation requests comprises:
writing copies of said data item to new sections of said plurality of data storage devices; and
reconfiguring a plurality of pointers to point to said new sections of said plurality of data storage devices.

16. The method of claim 15, further comprising deleting copies of said data item in sections of said plurality of data storage devices that are no longer pointed to by said plurality of pointers.

17. A computer program product that includes a medium readable by a processor, the medium having stored thereon a sequence of instructions which, when executed by said processor, causes said processor to execute a process of writing a data item to a storage system having a plurality of data storage devices, said process:
receiving a write request for writing a predetermined number of copies of said data item to said plurality of data storage devices; and
initiating write operation requests to a selected number of said plurality of data storage devices in response to said write request, the selected number exceeding said predetermined number.

18. The computer program product of claim 17, wherein said process further comprises identifying a first set of said write operation requests that is are projected to produce a fastest response time.

19. The computer program product of claim 18, wherein said process further comprises canceling a second set of said write operation requests.

20. The computer program product of claim 18, wherein said process further comprises:
completing a second set of said write operation requests; and
deleting copies of said data item written by said second set of said write operation requests.

21. The computer program product of claim 18, wherein identifying a first set of said write operation requests comprises identifying said first set of said write operation requests as being first to complete writing said data item to said selected number of said plurality of data storage devices.

22. The computer program product of claim 18, wherein identifying a first set of said write operation requests comprises identifying said first set of said write operation requests as being first in moving from one level of request queues to another.

23. The computer program product of claim 17, wherein receiving a write request comprises receiving said write request for writing said data item to at least two of said plurality of data storage devices.

24. A computer program product that includes a medium readable by a processor, the medium having stored thereon a sequence of instructions which, when executed by said processor, causes said processor to execute a process of updating a data item stored in a storage system having a plurality of data storage devices, said process comprising:
receiving an update request for maintaining a predetermined number of copies of said data item in said plurality of data storage devices; and
initiating update operation requests to a selected number of said plurality of data storage devices in response to said update request, said selected number exceeding said predetermined number.

25. The computer program product of claim 24, wherein said process further comprises identifying a first set of said update operation requests that are projected to produce a fastest response time.

26. The computer program product of claim 25, wherein said process further comprises canceling a second set of said update operation requests.

27. The computer program product of claim 25, wherein said process further comprises:
completing a second set of said update operation requests; and
deleting copies of said data item written by said second set of said update operation requests.

28. The computer program product of claims wherein identifying a first set of said update operation requests comprises identifying said first set of said update operation requests as being first to update said data item to said selected number of said plurality of data storage devices.

29. The computer program product of claim 25, wherein identifying a first set of said update operation requests comprises identifying said first set of said update operation requests as being first in moving from one level of request queues to another.

30. The computer program product of claim 24, wherein initiating update operation requests comprises initiating at least one of said update operation requests for updating an existing copy of said data item on one of said plurality of data storage devices.

31. The computer program product of claim 24, wherein initiating update operation requests comprises:
writing copies of said data item to new sections of said plurality of data storage devices; and
reconfiguring a plurality of pointers to point to said new sections of said plurality of data storage devices.

32. The computer program product of claim 31, wherein said process further comprises deleting copies of said data item in sections of said plurality of data storage devices that are no longer pointed to by said plurality of pointers.

* * * * *

UNITED STATES PATENT AND TRADEMARK OFFICE
CERTIFICATE OF CORRECTION

PATENT NO. : 6,708,237 B1
APPLICATION NO. : 10/008347
DATED : March 16, 2004
INVENTOR(S) : William Bridge It is certified that error appears in the above-identified patent and that said Letters Patent is hereby corrected as shown below:

On column 12, line 40: Please replace "claims wherein" with -- claim 25, wherein --.

Signed and Sealed this

Fourteenth Day of November, 2006

JON W. DUDAS
*Director of the United States Patent and Trademark Office*